(12) United States Patent
Velthoen

(10) Patent No.: US 8,341,168 B1
(45) Date of Patent: Dec. 25, 2012

(54) SYSTEM FOR DISPLAYING HIERARCHICAL DATA

(75) Inventor: Brent Velthoen, Danville, CA (US)

(73) Assignee: Workday, Inc., Pleasanton, CA (US)

( * ) Notice: Subject to any disclaimer, the term of this patent is extended or adjusted under 35 U.S.C. 154(b) by 278 days.

(21) Appl. No.: 12/455,804

(22) Filed: Jun. 4, 2009

(51) Int. Cl.
*G06F 17/30* (2006.01)

(52) U.S. Cl. ..................................... 707/758

(58) Field of Classification Search ................. 707/706, 707/754, 758, 805
See application file for complete search history.

(56) References Cited

U.S. PATENT DOCUMENTS

| | | | | | |
|---|---|---|---|---|---|
| 5,787,440 | A | * | 7/1998 | Bakke et al. ........................... | 1/1 |
| 6,023,715 | A | * | 2/2000 | Burkes et al. ................ | 715/207 |
| 6,037,935 | A | * | 3/2000 | Bates et al. .................... | 715/760 |
| 6,687,559 | B2 | * | 2/2004 | Radjy et al. ................... | 700/106 |
| 6,694,485 | B1 | * | 2/2004 | Kelley et al. .................. | 715/234 |
| 6,772,169 | B2 | * | 8/2004 | Kaplan ................................. | 1/1 |
| 6,831,668 | B2 | * | 12/2004 | Cras et al. ..................... | 715/853 |
| 6,948,132 | B2 | * | 9/2005 | Bennett et al. ................ | 715/760 |
| 7,003,732 | B1 | * | 2/2006 | Zhaksilikov ................... | 715/771 |
| 7,152,224 | B1 | * | 12/2006 | Kaler et al. .................... | 717/121 |
| 7,181,687 | B2 | * | 2/2007 | Bourdev ........................ | 715/234 |
| 7,193,583 | B2 | * | 3/2007 | Zerphy et al. .................. | 345/1.3 |
| 7,263,663 | B2 | * | 8/2007 | Ballard et al. ................. | 715/762 |
| 7,275,211 | B2 | * | 9/2007 | Ferguson et al. .............. | 715/234 |
| 7,337,180 | B2 | * | 2/2008 | Spriestersbach .............. | 707/805 |
| 7,668,888 | B2 | * | 2/2010 | Irle et al. ........................ | 707/756 |
| 7,882,104 | B2 | * | 2/2011 | Barsness et al. ............... | 707/721 |
| 8,095,872 | B2 | * | 1/2012 | Sellers et al. .................. | 715/251 |
| 2004/0064216 | A1 | * | 4/2004 | Coogan et al. ................. | 700/275 |
| 2005/0146485 | A1 | * | 7/2005 | Zerphy et al. .................. | 345/1.1 |
| 2006/0047649 | A1 | * | 3/2006 | Liang ............................... | 707/4 |
| 2007/0016887 | A1 | * | 1/2007 | Kaler et al. .................... | 717/101 |
| 2008/0183747 | A1 | * | 7/2008 | Mangipudi ............... | 707/103 R |
| 2009/0144250 | A1 | * | 6/2009 | Kapadia et al. ................... | 707/3 |
| 2010/0269062 | A1 | * | 10/2010 | Kobylinski ................... | 715/781 |

* cited by examiner

*Primary Examiner* — Cam-Linh Nguyen

(74) *Attorney, Agent, or Firm* — Van Pelt, Yi & James LLP

(57) ABSTRACT

A system for displaying hierarchical data comprises an interface and a processor. The interface is for receiving a request to view a data set. The data set comprises a set of data stored as linked objects in a database. The processor is configured to determine a chunk of the data set to be provided in response to the request that is displayed according to a set of display parameters.

24 Claims, 9 Drawing Sheets

SYSTEM FOR DISPLAYING HIERARCHICAL DATA

BACKGROUND OF THE INVENTION

In some database systems, data is stored on a server and delivered to a database user through a network in the form of a report. If there is a large amount of data in the report, transmission through the network can take a long time. A database user can only view a small amount of information at a given time, so it is inefficient to force the user to wait for the entire report to transfer before displaying the data. Report data in some systems is divided into smaller chunks called pages, and a database user only receives a single page at a time. By varying the page size, a compromise can be made between transfer time for a single page and frequency of transferring a new page. Database systems based on tables can break reports into pages by assigning each page to contain a predefined set of lines from the table. It then becomes a simple operation to determine the data contained in any given page and deliver it to a user when it is requested. In database systems based on linked networks of objects, breaking reports into pages is not as straightforward. For example, there is no direct way to determine how many objects (e.g., how many lines in the report) are linked to a given starting object, and there is no direct way to access a predefined set of lines in the report.

BRIEF DESCRIPTION OF THE DRAWINGS

Various embodiments of the invention are disclosed in the following detailed description and the accompanying drawings.

DETAILED DESCRIPTION

Figure 1:
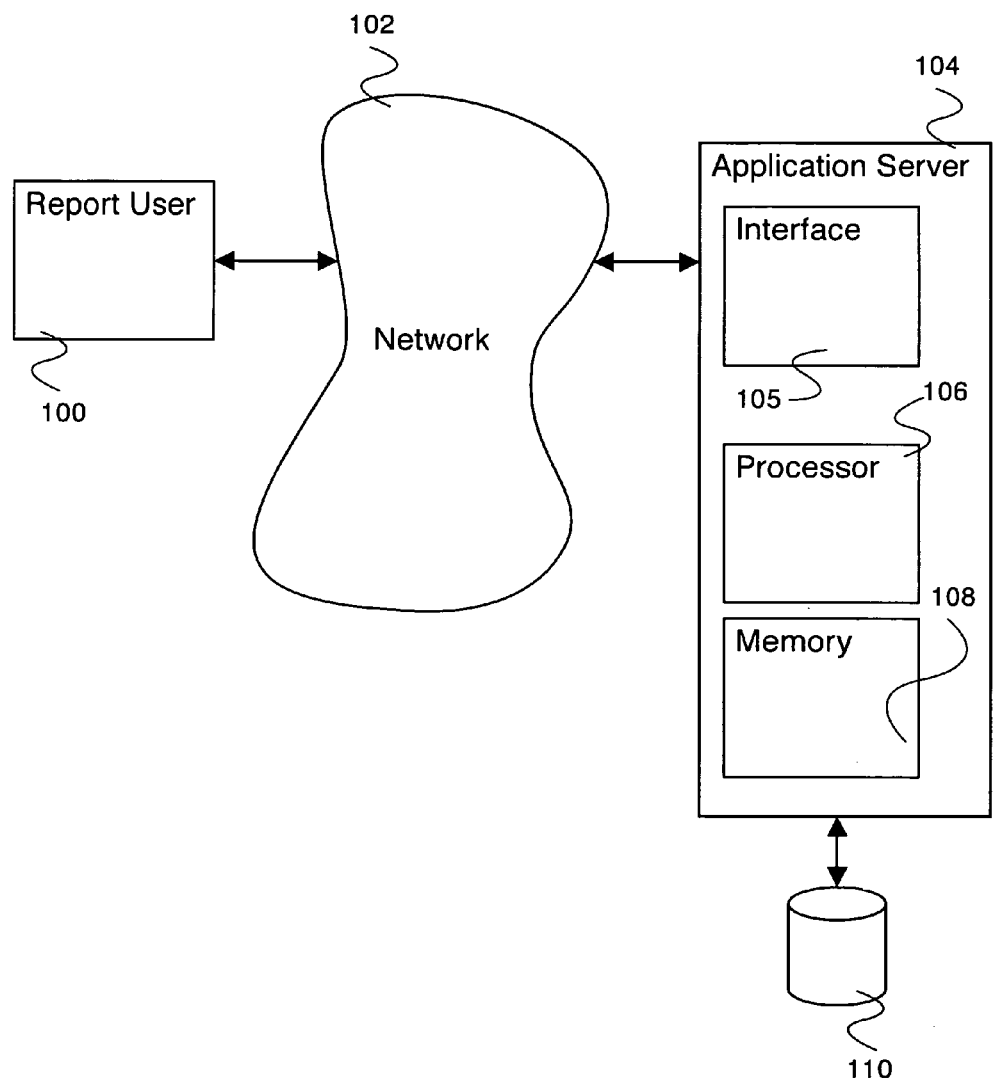
FIG. 1 is a block diagram illustrating an embodiment of a network system.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for displaying hierarchical data is disclosed. The system comprises an interface and a processor. The interface is for receiving a request to view a data set. The data set comprises a set of data stored as linked objects in a database. The processor is configured to determine a chunk of the data set to be provided in response to the request that is displayed according to a set of display parameters.

In some embodiments, the system for displaying for hierarchical data comprises a system for generating a chunking for data that is to be displayed as pages for a user from an object-based database. An object-based database stores its data as a linked network of objects. When a report is prepared, the links between objects are traversed and data is collected, flattening the network structure of the object-based database into a list. This flattened list can then be broken into pages by assigning each page to contain a predefined set of lines from the list. However, flattening and paging the report on the server before delivering it to the database user can be very computationally expensive for large reports. Instead, when a database server receives a request for a page of a report from the database, it counts lines as it traverses the hierarchical database until it reaches the line at which the page has been designated to start. The database server then copies the desired number of lines into the page and delivers the page to the database user.

Paging in an object-based database is implemented on an application server connected to a network. The application server comprises software for paging in an object-based database along with network communication hardware for communicating with users (e.g., a report designer, a report user) accessing the network from different points.

FIG. 1 is a block diagram illustrating an embodiment of a network system. In the example shown, application server 104 includes interface 105, processor 106 and memory 108. Application server 104 is coupled to external storage 110 so that application server 104 is able to store information to and access information from external storage 110. Application server 104 is also coupled to network 102 using interface 105. In various embodiments, network 102 comprises one or more of the following: a local area network, a wide area network, a wired network, a wireless network, the Internet, or any other appropriate network. Report user 100 accesses application server 104 using network 102. In some embodiments, report user 100 accesses an application running on application server 104. The application prepares reports based on stored data. In various embodiments, stored data is related to a business requirement such as an expense report, a personnel file, data related to an employee, or any other relevant data. In some embodiments, stored data is stored in an object-based database. In various embodiments, the application comprises an enterprise application, a human resources application, a business process application, a finance application, a content management application, or any other appropriate application. In some embodiments, application server 104 delivers stored data to report user 100 as a series of relatively small pages rather than delivering all appropriate stored data in a single relatively larger chunk. The relatively small pages correspond approximately to an amount of data that is viewable in a user screen view.

In various embodiments, application server 104 comprises one or more physical servers with one or more processors, one or more memories, and one or more other storage devices (e.g., hard drives, array of drives, etc.) and/or one or more virtual environments (e.g., virtualization of operating system or application processes) in which an application is executed.

Figure 2:
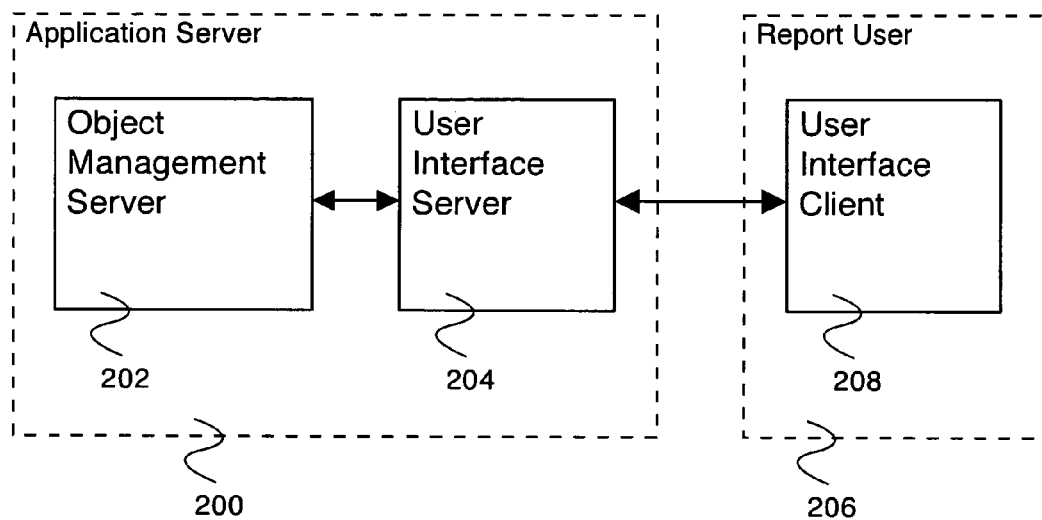
FIG. 2 is a block diagram illustrating an embodiment of a system for a paging in an object-based database.

FIG. 2 is a block diagram illustrating an embodiment of a system for a paging in an object-based database. In some embodiments, application server 200 comprises application server 104 of FIG. 1 and report user 206 comprises report user 100 of FIG. 1. In the example shown, application server 200 comprises object management server 202 and user interface server 204. Object management server 202 comprises a server for storing data in an object-based database. In various embodiments, data stored in object management server 202 is related to a business requirement such as an expense report, a personnel file, data related to an employee, or any other relevant data. User interface server 204 comprises a server for delivering user interface information to user interface client 208. User interface client 208 comprises client software for receiving user interface information from a server and displaying it for a user. In some embodiments, user interface server 204 requests information from object management server 202 and delivers it in an appropriate format to user interface client 208. In some embodiments, a report user makes a request for a report using user interface client 208. In some embodiments, when user interface server 204 receives a request for a report from user interface client 208, interface server 204 requests the report from object management server 202, breaks the report into a series of relatively small pages, and delivers the pages to user interface client 208 one at a time.

Figure 3:
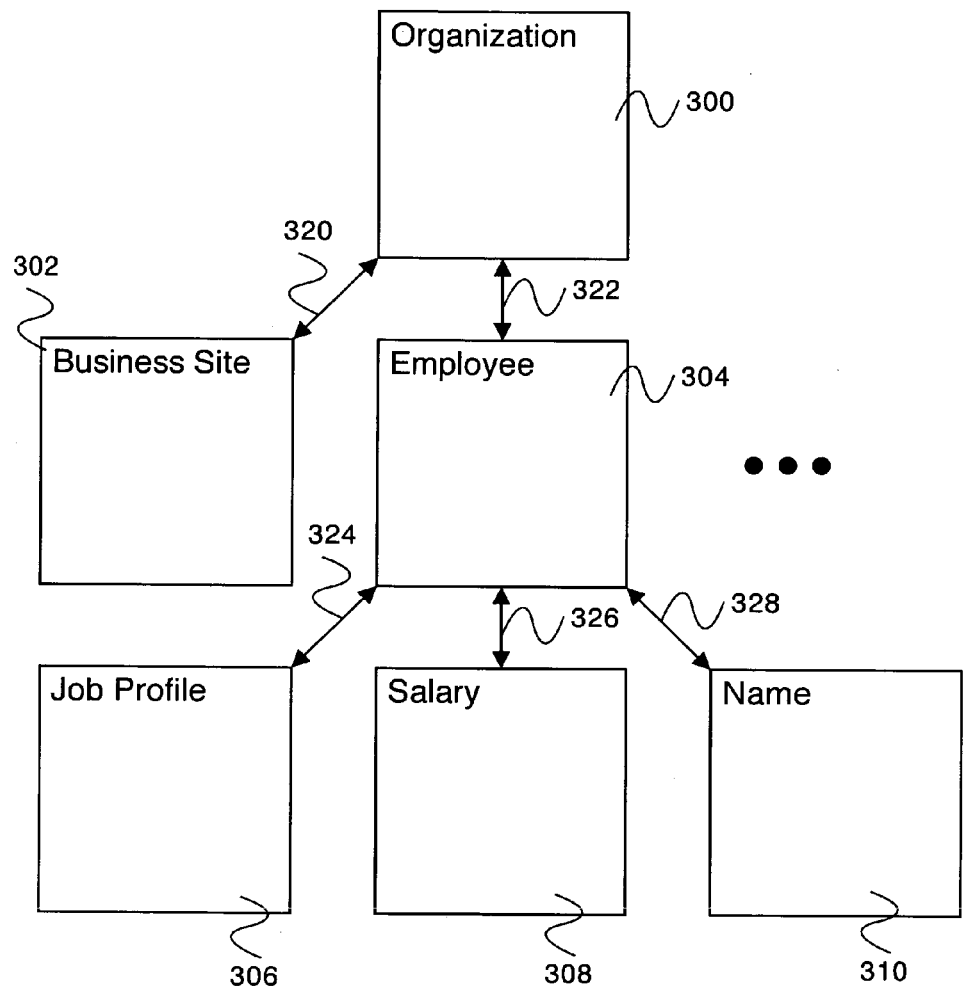
FIG. 3 is a block diagram illustrating an embodiment of data stored in an object-based database.

FIG. 3 is a block diagram illustrating an embodiment of data stored in an object-based database. In some embodiments, the data of FIG. 3 is stored in object management server 202 of FIG. 2, and used to prepare a report requested by user interface client 208 of FIG. 2. In some embodiments, objects 300, 302, 304, 306, 308, and 310 comprise object data structures. Object data structures comprise data, relations to other object data structures, and methods for operating on the data and relations. In some embodiments, relations 320, 322, 324, 326, and 328 comprise relations between object data structures. In the example shown, objects represented in FIG. 3 represent a part of a business data structure. Organization 300 has relation 320 to business site object 302. Business site object 302 includes the name of the site at which the organization resides. Organization 300 also has relation 322 to employee objects such as employee object 304, each representing an employee that is part of the organization. Employee object 304 has relation 324, relation 326, and relation 328 to job profile object 306, salary object 308, and name object 310, respectively. Job profile object 306 includes job profile attributes corresponding to employee 304. Salary object 308 includes salary attributes corresponding to employee 304. Name object 310 includes name attributes corresponding to employee 304. In this way, data can be stored in a way representing the organizational structure of the company. In some embodiments, application programs access attribute data throughout the object tree by traversing the object tree along the connections between objects given by relationships, and operate on the accessed attribute data to create a meaningful report about the organization. For example, a report is requested regarding a total of all salaries paid to all employees at an organization; object tree is traversed to access each salary object (e.g., salary 308) via their associated employee (e.g., employee 304).

In various embodiments, data in object data structures comprise one or more of the following: a worker, a compensation plan, a component of a compensation plan that specifies a compensation amount and frequency (e.g. yearly); a business unit, a financial statement, a profit, a loss, an appreciation, a depreciation, an asset, a liability, an interest, a cost, an expense; an appraisal, an approval, an estimate, or any other appropriate data. In various embodiments, relations between object data structures comprise one of the following: a worker is assigned one compensation plan that has one or more compensation plan components; a business unit has a profit and loss statement that includes expense(s) and/or interest, or any other appropriate relation. In various embodiments, methods for operating on the data and relations comprise one of the following: calculate the total compensation amount for a worker for a specific period of time based on the worker's compensation plan and its components; calculate total costs for a specific period of time based on profit and loss statement from one or more business unit(s); or any other appropriate method.

Figure 4:
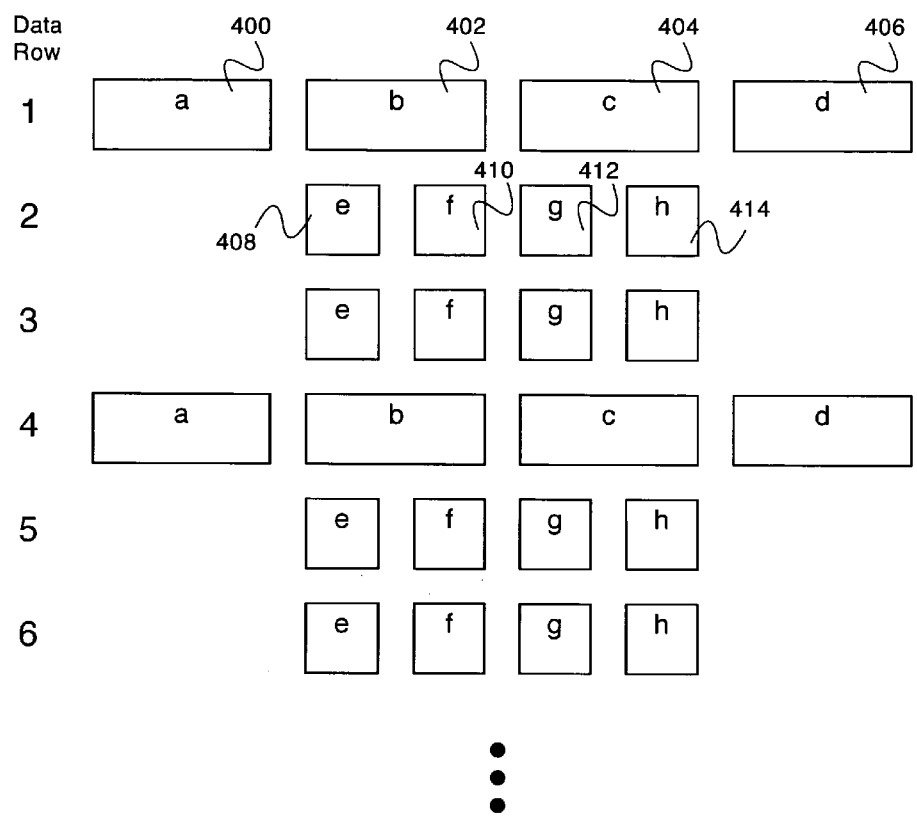
FIG. 4 is a diagram illustrating an embodiment of a report created from a hierarchical data structure.

FIG. 4 is a diagram illustrating an embodiment of a report created from a hierarchical data structure. In some embodiments, the report of FIG. 4 is created from data stored in an object-based database (e.g., data stored in the object based database of FIG. 3). In some embodiments, the report of FIG. 4 is displayed on a user interface client (e.g., user interface client 208 of FIG. 2). In some embodiments, data in the report of FIG. 4 is retrieved by a user interface server (e.g., user interface server 204 of FIG. 2) from an object management server (e.g., object management server 202 of FIG. 2) in response to a request from the user interface client.

In the example shown, data entry 400, data entry 402, data entry 404, data entry 406, data entry 408, data entry 410, data entry 412, and data entry 414 comprise data retrieved from an object-based database. Each data row (e.g., data row 1, data row 2, data row 3, etc.) displays data from a single data object or from children of a single data object. Data row 1 comprises data entry 400, data entry 402, data entry 404, and data entry 406 (labeled a, b, c, and d, respectively), each corresponding to a stored data entry in a data object. Data entry 400 and data entry 406 have no relations (e.g., relations as shown in FIG. 3) to other data objects, and data entry 402 and data entry 404 each have relations to two other data objects, each of which have two data entries displayed in the report. Data row 2 comprises data entry 408, data entry 410, data entry 412, and data entry 414 (labeled e, f, g, and h, respectively). Data entry 408 and data entry 410 comprise data entries of a data object accessed by a relation from data entry 402, and data entry 412 and data entry 414 comprise data entries of a data object accessed by a relation from data entry 404. For example, data entry 402 and data entry 404 could be business sites of a company, data entry 408 and data entry 410 employees at the business site represented by data entry 402, and data entry 412 and data entry 414 employees at the business site represented by data entry 404. Data row 3 comprises a second set of data entries accessed by relations from data entries in row 1, similarly to data row 2. Data row 4, data row 5, and data row 6 comprise data entries of a new data object and data objects accessed by relations from the data entries, similarly to data rows 1, 2, and 3.

In some embodiments, data in the report of FIG. 4 is broken into relatively small pages by the user interface server and delivered to the user interface client one page at a time. In various embodiments, the amount of data in a page is determined by comparing a count of data rows to a maximum data row value, by comparing a count of data entries to a maximum data entry value, or by any other appropriate metric. In some embodiments, the end of a page can be found directly from a known location of the beginning of the page. In some embodiments, the hierarchical data storage prevents the end of the page from being found directly, as the number of entries that will be found by following relations is not known without explicitly traversing the relations, and the end of a page is found by starting at a known location of the beginning of the page and counting data lines or data entries as the relations are traversed, until the page maximum has been reached.

In some embodiments, data row 1 and data row 4 are one type of row displaying a set of data in a first configuration and data row 2, data row 3, data row 5, and data row 6 are a second type of data row displaying a different set of data in a second configuration. For example, data e and data f are related to data b. Data e and data f are placed adjacent or within overlapping columns to data b to indicate a relation between data e/data f and data b. For another example, data g and data h are related to data c. Data g and data h are placed adjacent or within overlapping columns to data c to indicate a relation between data g/data h and data c. For example, row 4 lists supervisors (e.g., a: John Doe, b: Bob Smith, c: Jane Li, d: Ann Jones) and supervisor b and supervisor c in row 4 have a reporting employee displayed in row 5 along with their title (e.g., employee e: David Park, f: Assistant associated with supervisor b; and employee g: Mary Baker, H: Account Manager associated with supervisor c). For another example, supervisor b and supervisor c have additional employees listed in row 6. In some embodiments, supervisor b may have more employees associated than supervisor c, in which case there are some rows that have entries in e and f below b and no entries in g and h below c. This display method provides an efficient manner of displaying related data of a linked object database.

In various embodiments, a single row displays information that is pulled from several data objects, from a single data object, or any other appropriate data objects. In some embodiments, "children of a single data object" is not the same as a child row. In some embodiments, child rows represent children of a data object (e.g. master detail).

Figure 5A:
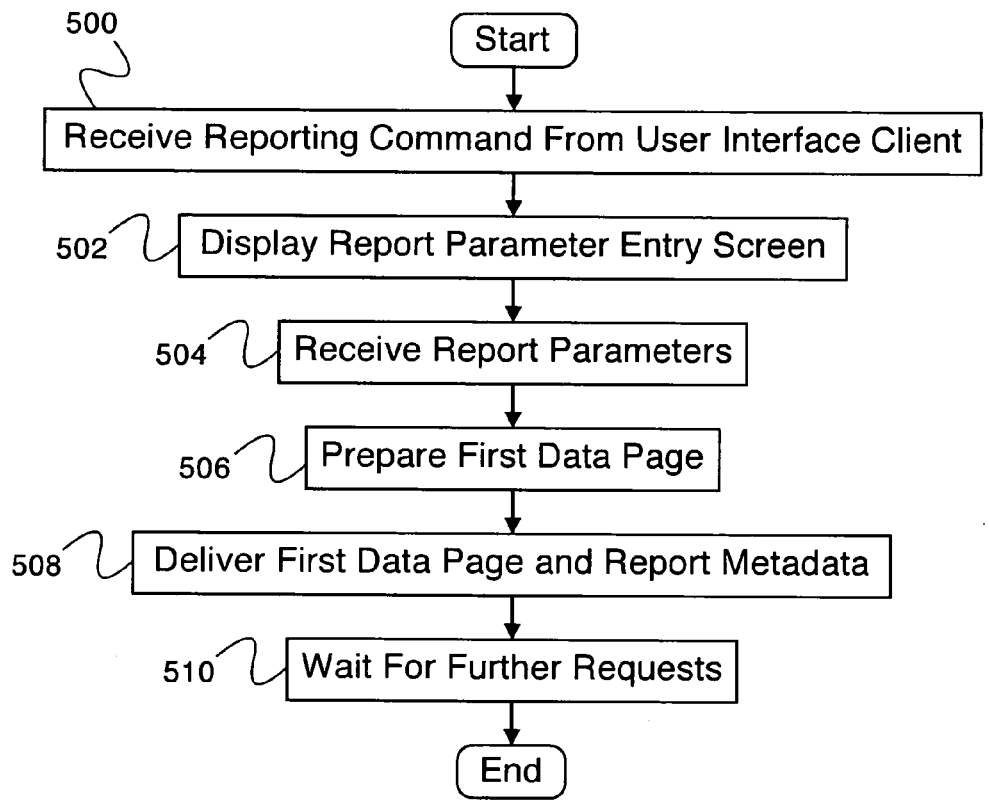
FIG. 5A is a flow diagram illustrating an embodiment of a process for accessing report data.

FIG. 5A is a flow diagram illustrating an embodiment of a process for accessing report data. In some embodiments, the process is executed by a user interface server (e.g., user interface server 204 of FIG. 2) in response to a request for report data by a report user (e.g., report user 100 of FIG. 1). In the example shown, in 500, a reporting command is received from a user interface client (e.g., user interface client 208 of FIG. 2). In some embodiments, a user logs into the user interface client prior to issuing a reporting command. In various embodiments, logging into the user interface client comprises entering a username and password into a terminal or other prompt, entering a URL into a web browser, executing an application, or any other appropriate method of logging into the user interface client. In 502, the report parameter entry screen is displayed. In some embodiments, the report parameter entry screen is displayed on the user interface client. In various embodiments, the report parameter entry screen comprises fields for entering data, pull-down menus, checkboxes, buttons, or any other appropriate interface devices for entering report data. In various embodiments, report parameters include data object type, starting data object, data filters, data sorting criteria, data hierarchy level (s) to display, or any other appropriate report parameters. In 504, report parameters are received. In various embodiments, report parameters include display parameters (e.g., number of rows, number of columns, number of cells, and/or frozen cell(s), row(s), and/or column(s) that are able to be displayed by a report requestor's display). In various embodiments, display parameters are received at a setup time for a user's session with a server, a login time, an application start time, or any other appropriate time for receiving display parameters. In some embodiments, report parameters are received by the user interface server from the user interface client, in response to a user's entry of report parameters on the report parameter entry screen. In 506, the first data page is prepared. In some embodiments, if the number of lines of data or number of data entries comprising the report is greater than a predetermined threshold, the report is broken into pages, which are then delivered one at a time. In some embodiments, preparing the first data page comprises determining the set of lines of the report contained in the first data page. In some embodiments, a first page of data to be displayed comprises a chunk of data appropriate to be displayed on a requestor's display. In some embodiments, the chunk of data is larger than the requestor's display but smaller than the entire data set in order to allow a user some scrolling of data to be viewed without refreshing the data from a server. In 508, the first data page and report metadata are delivered. In various embodiments, report metadata comprises the total number of lines in the report, report column labels, or any other appropriate report metadata. In 510, the user interface server waits for further requests, and the process ends.

Figure 5B:
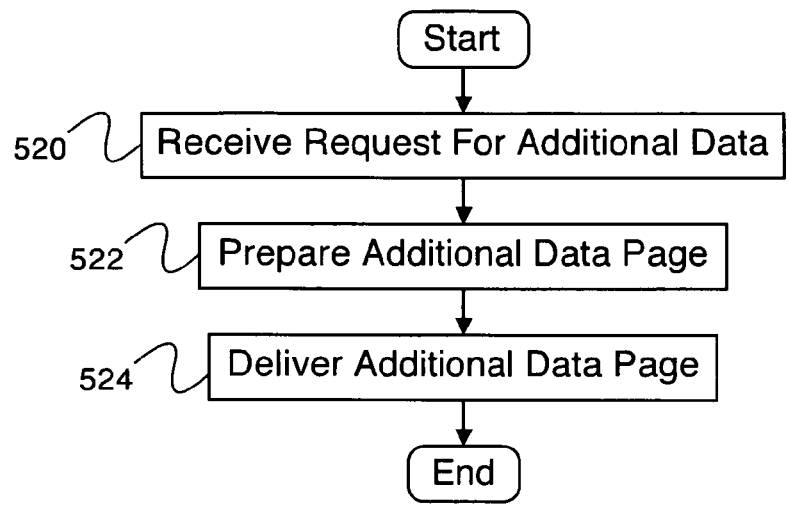
FIG. 5B is a flow diagram illustrating an embodiment of a process for responding to a request for additional data.

FIG. 5B is a flow diagram illustrating an embodiment of a process for responding to a request for additional data. In some embodiments, the process is executed by a user interface server (e.g., user interface server 204 of FIG. 2) in response to a request for report data by a report user (e.g., report user 100 of FIG. 1). In some embodiments, the process is executed in response to a request for additional data while the user interface server is waiting for further requests (e.g., in 510 of FIG. 5A). In 520, a request for additional data is received. In various embodiments, the request for additional data comprises a report name, a report start line, a report finish line, a report page size, report sorting criteria, report filtering criteria, rows/columns to be frozen and/or rows/columns that can be scrolled, or any other appropriate parameters. In 522, the additional data page is prepared. In some embodiments, preparing the additional data page comprises determining the set of lines of the report contained in the additional data page. In various embodiments, display parameters comprising row/column minima and maxima are indicated using a slider or scroll bar in a user interface. In 524, the additional data page is delivered, and the process ends.

Figure 5C:
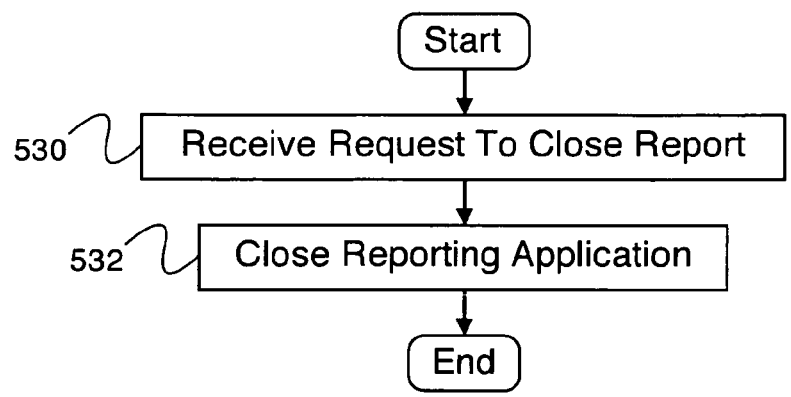
FIG. 5C is a flow diagram illustrating an embodiment of a process for responding to a request to close the report.

FIG. 5C is a flow diagram illustrating an embodiment of a process for responding to a request to close the report. In some embodiments, the process is executed by a user interface server (e.g., user interface server 204 of FIG. 2) in response to a request to end the report by a report user (e.g., report user 100 of FIG. 1). In some embodiments, the process is executed in response to a request to close the report while the user interface server is waiting for further requests (e.g., in 510 of FIG. 5A). In 530, a request to close the report is received. In 532, the reporting application closes the report, and the process ends.

Figure 6:
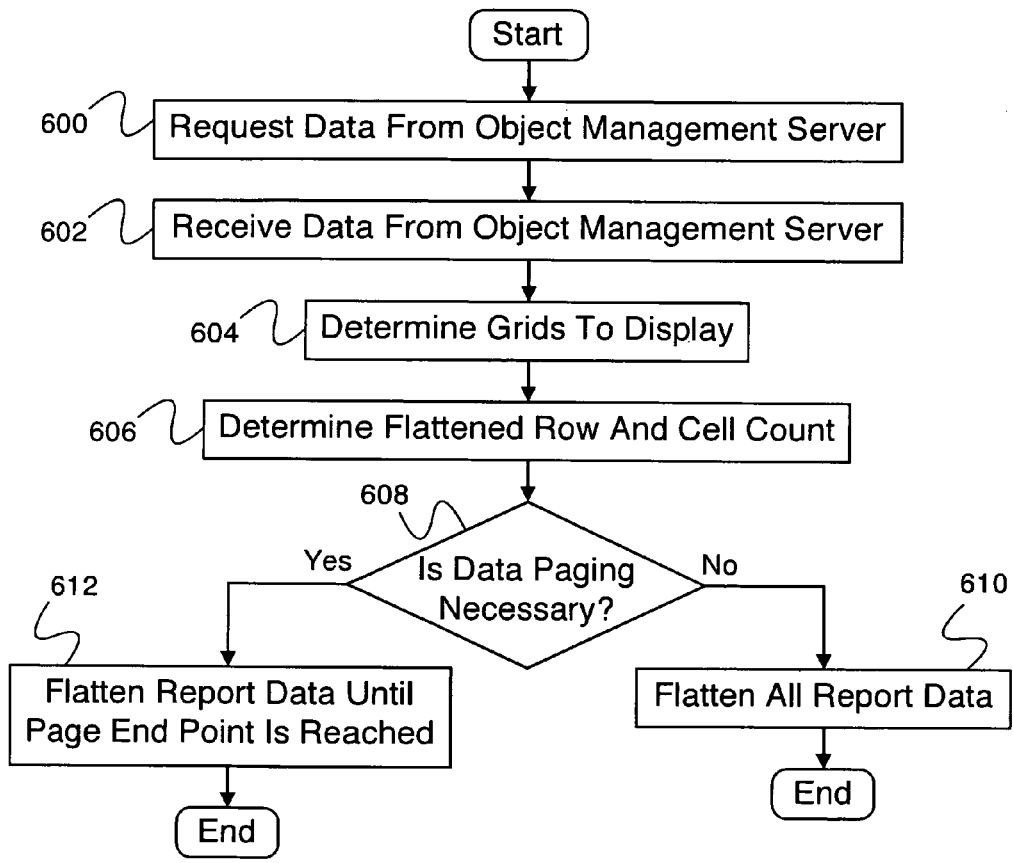
FIG. 6 is a flow diagram illustrating an embodiment of a process for preparing the first data page of a report.

FIG. 6 is a flow diagram illustrating an embodiment of a process for preparing the first data page of a report. In some embodiments, the process is executed by a user interface server (e.g., user interface server 204 of FIG. 2) in response to a request for report data by a report user (e.g., report user 100 of FIG. 1). In some embodiments, the process of FIG. 6 implements 506 of FIG. 5. In 600, data is requested from the object management server (e.g., object management server 202 of FIG. 2). In some embodiments, the request for data depends on a set of report parameters (e.g., report parameters received in 504 of FIG. 5). In 602, data is received from the object management server. In some embodiments, data received from the object management server is stored in an object-based database (e.g., the object-based database of FIG. 3). In 604, the grids to display are determined. Determining the grids to display comprises analyzing the data received in 602 and determining the objects contained within the displayed hierarchy level of the received data. In some embodiments, the displayed hierarchy level is a report parameter received by the user interface server (e.g., as part of report parameters received in 504 of FIG. 5). In 606, the flattened row and cell count of the data received in 602 is determined. Each row of data received in 602 that was determined to be displayed in 604 is counted, and its number of cells is counted, to determine a total number of rows and cells in the report to display. In 608 it is determined whether data paging is necessary. In various embodiments, data paging is necessary in the event that the total number of rows is above a maximum number of total rows per page, in the event that the total number of cells is above a maximum number of total cells per page, in the event that either the total number of rows is above a maximum number of total rows per page or the total number of cells is above a maximum number of total cells per page, in the event that both the total number of rows is above a maximum number of total rows per page and the total number of cells is above a maximum number of total cells per page, or in the event that any other appropriate data paging criteria is satisfied.

In the event that it is determined in 608 that data paging is not necessary, control passes to 610. In 610, all report data is flattened. Flattening report data comprises extracting data from the object-based database and inserting the data into a table such that it can be displayed as a set of rows. In some embodiments, the hierarchical data is flattened up to the displayed hierarchy level. In some embodiments, in the event that page-sorting criteria are defined (e.g., as part of page parameters received in 504 of FIG. 5), the branches of the hierarchy are traversed according to the page-sorting criteria, in order to ensure that the data in the table are sorted (e.g., data are displayed in the table according to a sorting criteria—for example, alphabetical, descending alphabetical, ascending numerical, descending numerical, etc.) according to the page-sorting criteria. In some embodiments, in the event that page-filtering criteria are defined (e.g., as part of page parameters received in 504 of FIG. 5), the data in the table are filtered (e.g., a portion of the data in the table are not shown based on the criteria or shown based on the criteria) according to the page-filtering criteria. Once all report data has been flattened and processed appropriately, report preparation is complete, and the process ends. In the event that it is determined in 608 that data paging is necessary, control passes to 612. In 612, the first page of report data is flattened. Flattening the first page of report data comprises extracting data from the object-based database and inserting data into a table such that the data can be displayed as a set of rows, until the table size reaches a predetermined threshold. In some embodiments, in the event that page-sorting criteria are defined, the branches of the hierarchy are traversed according to the page-sorting criteria, in order to ensure that the data in the table are sorted according to the page-sorting criteria. In some embodiments, in the event that page-filtering criteria are defined, the data in the table are filtered according to the page-filtering criteria. In various embodiments, the table size threshold comprises a number of rows, a number of cells, either a number or rows or a number of cells, both a number of rows and a number of cells, or any other appropriate table size threshold. Once the first page of report data has been flattened, report preparation is complete, and the process ends.

Figure 7:
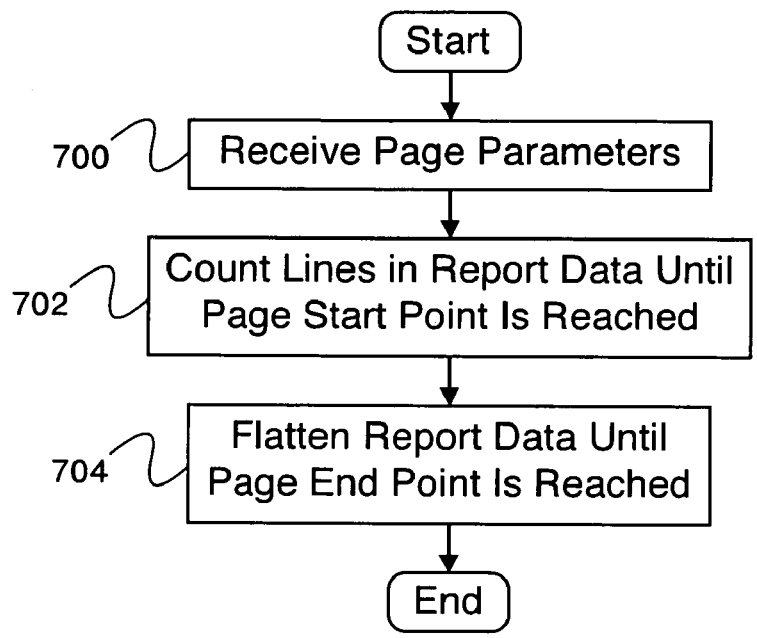
FIG. 7 is a flow diagram illustrating a process for preparing an additional data page.

FIG. 7 is a flow diagram illustrating a process for preparing an additional data page. In some embodiments, the process is executed by a user interface server (e.g., user interface server 204 of FIG. 2) in response to a request for additional report data by a report user (e.g., report user 100 of FIG. 1). In some embodiments, the process of FIG. 7 implements 522 of FIG. 5B. In the example shown, in 700, page parameters are received. In various embodiments, page parameters comprise a page start point, a page end point, a total page row count, a total page cell count, page sorting criteria, page filtering criteria, or any other appropriate page parameters. In 702, lines are counted in the report data until the page start point is reached. In some embodiments, lines are counted in the report data by traversing the data (e.g., data received in 602 of FIG. 6) up to a predetermined hierarchy level while counting objects encountered. In some embodiments, in the event that page-sorting criteria are defined (e.g., as part of page parameters received in 504 of FIG. 5), the branches of the hierarchy are traversed according to the page-sorting criteria while counting lines, in order to ensure that the data in the table are sorted according to the page-sorting criteria. In some embodiments, in the event that page-filtering criteria are defined (e.g., as part of page parameters received in 504 of FIG. 5), the data in the table are filtered while counting lines according to the page-filtering criteria. In 704, the report data is flattened until the page end point is reached. Flattening report data until the page end point is reached comprises extracting data from the object-based database, starting at the page start point determined in 702, and inserting report data into a table such that report data can be displayed as a set of rows, until the table size reaches a predetermined threshold. In some embodiments, in the event that page-sorting criteria are defined, the branches of the hierarchy are traversed according to the page-sorting criteria, in order to ensure that the data in the table are sorted according to the page-sorting criteria. In some embodiments, in the event that page-filtering criteria are defined, the data in the table are filtered according to the page-filtering criteria. In various embodiments, the table size threshold comprises a number of rows, a number of cells, either a number or rows or a number of cells, both a number of rows and a number of cells, or any other appropriate table size threshold. Once the page of report data has been flattened, report preparation is complete, and the process ends.

Figure 8:
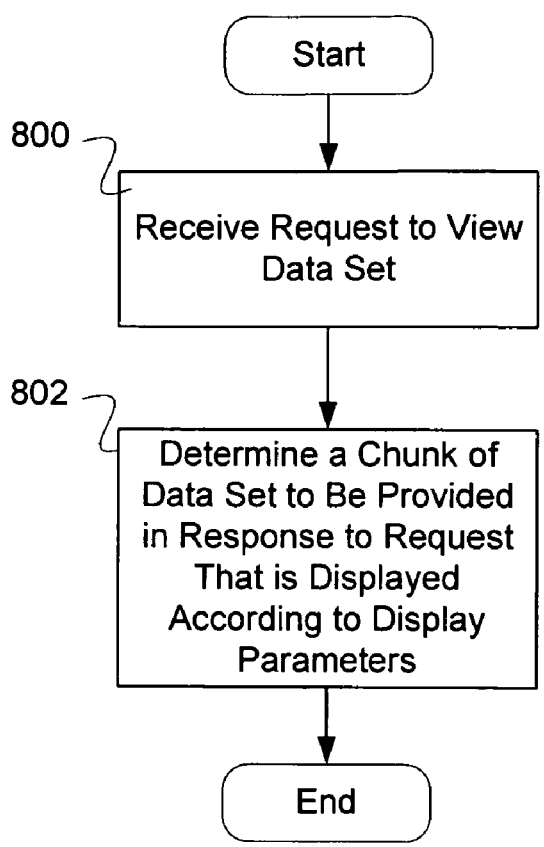
FIG. 8 is a flow diagram illustrating an embodiment of a process for displaying hierarchical data.

FIG. 8 is a flow diagram illustrating an embodiment of a process for displaying hierarchical data. In some embodiments, the process of FIG. 8 is used by application server 104 of FIG. 1 for displaying hierarchical data. In the example shown, in 800, a request to view a data set is received. The data set comprises a set of data stored as linked object in a database. In various embodiments, the request to view the data set includes one or more of a data object type, a starting data object, a data filter, a data sorting criteria, a data hierarchy level to display, or any other appropriate data set request parameters. In 802, a chunk of the data set to be provided in response to the request is determined that is displayed according to a set of display parameters, and the process ends. In some embodiments, the chunk is determined using a processor. In various embodiments, the set of display parameters includes one or more of a number of rows, a number of columns, a number of cells, a frozen row, a frozen column, a frozen cell, or any other appropriate display parameters. In some embodiments, the chunk of the data set is determined based at least in part on displaying a data set hierarchy by displaying a first linked data cell adjacent to a second linked data cell. In some embodiments, the chunk of the data set is determined based at least in part on displaying a data set hierarchy by displaying a first set of linked data cells adjacent to a second linked data cell, wherein one cell of the first set of linked data cells is adjacent to the second linked data cell. In some embodiments, the chunk of the data set to be provided is determined using the process of FIG. 5A. In some embodiments, the chunk of the data set to be provided is determined using the process of FIG. 5B.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for displaying hierarchical data, comprising:
    an interface for receiving a request to view a data set, wherein the data set comprises a set of data stored as linked objects of a hierarchical data structure in a database, wherein the request comprises a limit of data entries to be displayed in a report, wherein the data entries in the report comprise data flattened from the linked objects of the hierarchical data structure; and
    a processor configured to:
    determine a set of data entries to be provided in response to the request that is displayed according to a set of display parameters, wherein determining the set of data entries comprises traversing the linked objects of the hierarchical data structure up to the limit and generating the set of data entries from the traversed linked objects;
    determine a flattened row count and a cell count for displaying the set of data entries;
    determine whether paging is necessary based on the flattened row count and the cell count;
    in the event that paging is not necessary,
        flatten the set of data entries;
        provide the flattened set of data entries for display; and
    in the event that paging is necessary,
        flatten the set of data entries page by page for each page; and
        provide each page for display,
    wherein flattening the set of data entries includes using the set of data entries from the traversed linked objects and inserting the set of data entries into a table to be displayed as a set of rows.

2. A system as in claim 1, wherein the request to view the data set includes one or more of the following: a data object type, a starting data object, a data filter, a data sorting criteria, or a data hierarchy level to display.

3. A system as in claim 1, wherein the set of display parameters includes one or more of the following: a number of rows, a number of columns, a number of cells, a frozen row, a frozen column, or a frozen cell.

4. A system as in claim 1, wherein the set of data entries that is displayed according to a set of display parameters also comprises representing a relationship between data from linked objects of the hierarchical data structure by displaying a first linked data cell adjacent to a second linked data cell.

5. A system as in claim 1, wherein the set of data entries that is displayed according to a set of display parameters also comprises representing a relationship between data from linked objects of the hierarchical data structure by displaying a first set of linked data cells adjacent to a second linked data cell, wherein one cell of the first set of linked data cells is adjacent to the second linked data cell.

6. A system as in claim 5, wherein the second linked data cell comprises a data cell in a row of data, and wherein the first set of linked data cells comprises a set of data cells linked to the data cell in the row of data, wherein the first set of linked data cells are displayed in adjacent rows of the row of data.

7. A method for displaying hierarchical data, comprising:
    receiving a request to view a data set, wherein the data set comprises a set of data stored as linked objects of a hierarchical data structure in a database, wherein the request comprises a limit of data entries to be displayed, wherein the data entries comprise data flattened from the linked objects of the hierarchical data structure; and
    determining, using a processor, a set of data entries to be provided in response to the request that is displayed according to a set of display parameters, wherein the determining the set of data entries comprises traversing the linked objects of the hierarchical data structure up to the limit and generating the set of data entries from the traversed linked objects;
    determining a flattened row count and a cell count for displaying the set of data entries;
    determining whether paging is necessary based on the flattened row count and the cell count;
    in the event that paging is not necessary,
        flattening the set of data entries;
        providing the flattened set of data entries for display; and
    in the event that paging is necessary,
        flattening the set of data entries page by page for each page; and
        providing each page for display,
    wherein flattening the set of data entries includes using the set of data entries from the traversed linked objects and inserting the set of data entries into a table to be displayed as a set of rows.

8. A method as in claim 7, wherein the request to view the data set includes one or more of the following: a data object type, a starting data object, a data filter, a data sorting criteria, or a data hierarchy level to display.

9. A method as in claim 7, wherein the set of display parameters includes one or more of the following: a number of rows, a number of columns, a number of cells, a frozen row, a frozen column, or a frozen cell.

10. A method as in claim 7, wherein the set of data entries that is displayed according to the set of display parameters also comprises representing a relationship between data from linked objects of the hierarchical data structure by displaying a first linked data cell adjacent to a second linked data cell.

11. A method as in claim 7, wherein the set of data entries that is displayed according to a set of display parameters also comprises representing a relationship between data from linked objects of the hierarchical data structure by displaying a first set of linked data cells adjacent to a second linked data cell, wherein one cell of the first set of linked data cells is adjacent to the second linked data cell.

12. A method as in claim 11, wherein the second linked data cell comprises a data cell in a row of data, and wherein the first set of linked data cells comprises a set of data cells linked to the data cell in the row of data, wherein the first set of linked data cells are displayed in adjacent rows of the row of data.

13. A computer program product for displaying hierarchical data, the computer program product being embodied in a non-transitory computer readable medium and comprising computer instructions for:
  receiving a request to view a data set, wherein the data set comprises a set of data stored as linked objects of a hierarchical data structure in a database, wherein the request comprises a limit of data entries to be displayed in a report, wherein the data entries in the report comprise data flattened from the linked objects of the hierarchical data structure; and
  determining a set of data entries to be provided in response to the request that is displayed according to a set of display parameters, wherein determining the set of data entries comprises traversing the linked objects of the hierarchical data structure up to the limit and generating the set of data entries from the traversed linked objects;
  determining a flattened row count and a cell count for displaying the set of data entries;
  determining whether paging is necessary based on the flattened row count and the cell count;
  in the event that paging is not necessary,
    flattening the set of data entries;
    providing the flattened set of data entries for display; and
  in the event that paging is necessary,
    flattening the set of data entries page by page for each page; and
    providing each page for display,
  wherein flattening the set of data entries includes the set of data entries from the traversed linked objects and inserting the set of data entries into a table to be displayed as a set of rows.

14. A computer program product as in claim 13, wherein the request to view the data set includes one or more of the following: a data object type, a starting data object, a data filter, a data sorting criteria, or a data hierarchy level to display.

15. A computer program product as in claim 13, wherein the set of display parameters includes one or more of the following: a number of rows, a number of columns, a number of cells, a frozen row, a frozen column, or a frozen cell.

16. A computer program product as in claim 13, wherein the set of data entries that is displayed according to a set of display parameters also comprises representing a relationship between data from linked objects of the hierarchical data structure by displaying a first linked data cell adjacent to a second linked data cell.

17. A computer program product as in claim 13, wherein the set of data entries that is displayed according to a set of display parameters also comprises representing a relationship between data from linked objects of the hierarchical data structure by displaying a first set of linked data cells adjacent to a second linked data cell, wherein one cell of the first set of linked data cells is adjacent to the second linked data cell.

18. A computer program product as in claim 17, wherein the second linked data cell comprises a data cell in a row of data, and wherein the first set of linked data cells comprises a set of data cells linked to the data cell in the row of data, wherein the first set of linked data cells are displayed in adjacent rows of the row of data.

19. A system as in claim 1, wherein the request includes a data object type.

20. A system as in claim 1, wherein the request includes a starting data object.

21. A system as in claim 1, wherein the request includes a data filter.

22. A system as in claim 1, wherein the request includes a data sorting criteria.

23. A system as in claim 1, wherein the request includes a data hierarchy level to display.

24. A system as in claim 1, wherein the limit of the data entries to be displayed comprises or can be calculated from one or more of the following: an ending page number, a data line maximum, a page maximum, a data entry maximum a range of pages, a range of lines, a range of data entries, a starting page number, a number of pages to be displayed, a number of rows to be displayed, a number of columns to be displayed, a number of lines to be displayed, a number of data entries per page.

* * * * *